3,521,137
CONTROL CIRCUIT FOR HYBRID PRIME MOVER ELECTRIC MOTOR SYSTEM
Harry Van Sweden, Roseville, Mich., assignor to Continental Aviation and Engineering Corporation, Detroit, Mich., a corporation of Virginia
Filed Nov. 3, 1967, Ser. No. 680,399
Int. Cl. H02p 5/28
U.S. Cl. 318—197                                   7 Claims

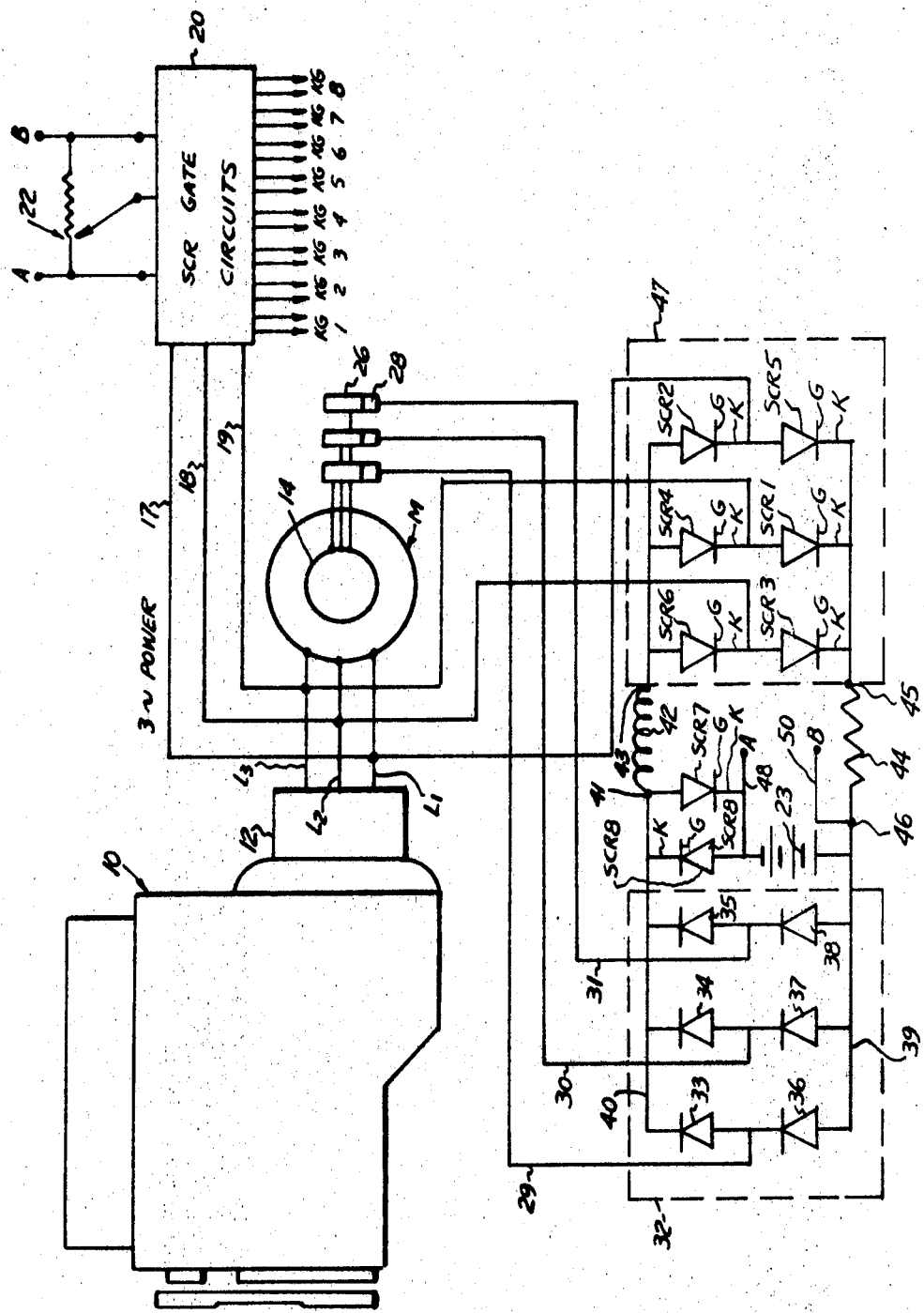

ABSTRACT OF THE DISCLOSURE

A prime mover supplies alternating current for driving a three-phase, wound rotor induction motor, while an additional source of power for the system is supplied by storage batteries which are used only for short intervals of time when increased horsepower is required. The battery power is automatically placed in the circuit when needed and the batteries are automatically recharged by means of a rotor circuit.

BACKGROUND OF THE INVENTION

Field of the invention

This invention relates to improvements in hybrid prime mover electric motor systems utilizing storage battery auxiliary power; the invention having particular though not exclusive utility in the propulsion of land vehicles.

Description of the prior art

In the prior art, various systems of combining a high speed prime mover for generating electric power to drive the wheels of the land vehicle have been used. Primarily such a system has been employed in diesel-electric control systems for locomotives and the like. Still other systems have been suggested for use with off-the-road military vehicles which require the drive to be of a constant horsepower type.

Due to the fact that electric motors are inherently constant-torque devices, their use has presented numerous regulating problems in conjunction with constant speed prime movers for specific uses such as for driving vehicles. A discussion of this general area will be found in the SAE Paper No. 660761 entitled "Vehicle Electric Drive Systems," by Alexander Kusko and Lee T. Magnuson, presented Oct. 17, 1966. Reference should be made to this paper for prior art proposals to solve the aforementioned difficulties.

SUMMARY

The present invention involves a means to overcome disadvantages of a hybrid prime mover electric motor power arrangement employing storage battery auxiliary power by the invention of a unique circuit using rotor current to charge the batteries of the system. In a typical arrangement, an internal combustion engine would drive a three-phase, high frequency alternator at a steady speed and at a maximum efficiency load point. The alternator output would energize the primary windings of a three-phase wound-rotor induction motor wherein speed control is accomplished by controlling an inverter, serving as the external rotor resistance. The armature is mechanically connected with a power transmitting means serving to perform the work which, in the disclosed embodiment, is the rotation of the wheels of the driven vehicle.

In this way the prime mover drives the alternator at a steady frequency supplying the motor with fixed voltage, fixed frequency, three phase alternating current; which produces a constant speed drive to the wheels under a constant load. To increase or decrease the vehicle speed, the inverter circuit is used to vary the rotor resistance, which in an induction motor changes the torque-speed characteristic allowing speed control. The rotor current output is picked up by slip rings, rectified and used to charge the storage batteries of the system. When the batteries are in a charged condition the inverter, controlled by a rectifier gate circuit, returns the rotor current back to the system while at the same time controlling the rotor resistance as commanded by the direct current control.

BRIEF DESCRIPTION OF THE DRAWINGS

The drawings is a schematic wiring diagram of an illustrative embodiment of my improved drive system.

DESCRIPTION OF THE PREFERRED EMBODIMENT

As above mentioned, the drive mechanism as disclosed herein is particularly suited for use in an automobile having a prime mover, such as a gasoline fueled internal combustion engine indicated at 10. The engine 10 of the instant embodiment is shown as a 75-horsepower, 4-cylinder engine directly connected to drive an alternator 12 at steady speed and at a maximum efficiency load point.

The alternator 12 supplies an induction motor M with fixed voltage, fixed frequency three-phase alternating current. The wound-rotor 14 shown diagrammatically as having a primary energized from the alternator 12 by lines L1, L2, L3 is the drive element and is mechanically connected with a power transmitting means (not shown) which serves to drive the wheels of the vehicle. The method of transmitting the power between the rotor 14 and the vehicle wheels forms no part of the present invention and could take any one of various well-known forms. The rotor produces a constant speed independent drive to certain of the vehicle wheels under a constant load.

To vary the vehicle speed the lines L1, L2, L3 are connected by conductors 17, 18, 19 to SCR gate circuits indicated at 20, having a suitable direct-current control by the variable resistor tap shown schematically at 22, and which is used to vary the resistance of the rotor 14 of the motor. A wound rotor motor is used because of its adjustable, varying speed characteristics in that for a given torque load, the speed is adjustable by changing the amount of secondary resistance.

The rotor 14 of the motor M constitutes the secondary of the motor and has three-phase winding on the rotor. One end of each phase is brought out to slip rings 26 on the motor shaft. Stationary brushes 28 are in contact with the slip rings and are connected by connections 29, 30, 31 to the input side of the bridge rectifier circuit, shown within a broken line box 32, which includes in the illustrated embodiment six rectifying diodes 33, 34, 35, 36, 37, 38.

The conductor 39 is connected to the anodes of the rectifiers 36, 37, 38 and the conductor 40 is connected to the cathodes of the rectifiers 33, 34, 35. A smoothing circuit for rectified voltage is connected to the terminal 41 and comprises an inductance 42 connected between the terminal 41 and the terminal 43 and a resistance 44 connected between the terminal 46 and the terminal 45.

The conductor 40 is connected to the battery 23 through a pair of electric switching devices SCR 7 and SCR 8 such as commercially referred to as silicon controlled rectifiers. The controlled rectifier SCR 8 has its cathode electrode connected to the rectifier 32 and its anode electrode connected to the battery while the controlled rectifier SCR 7 has its anode electrode connected to the rectifier 32 and its cathode electrode connected to the battery.

The anode of controlled rectifier SCR 8 and the cathode of controlled rectifier SCR 7 are connected by line 48 to terminal A while the terminal B is connected by line 50 to the battery. Thus the controlled rectifier SCR 8 has its anode connected in common with the cathode of the controlled rectifier SCR 7 and with the direct current voltage source of battery 23.

A static synchronous inverter, indicated within the portion of the circuit enclosed by dashed lines 47, is fed from the direct current supply of the rectifier shown at 32. The purpose of the inverter is to receive the slip power from the rotor and to deliver it to the alternating current lines L1, L2, L3. The inverter circuit is similar to the bridge rectifier 32 except that the diodes are replaced with silicon controlled rectifiers indicated by SCR 1 through SCR 6 in the drawing.

The SCR's require a source of phase-adjusting firming pulses which is supplied by the SCR gate circuit indicated at 20. The letter K in the circuit represents the connections to the cathode of each of the SCR's and the letter G represents the connection to the gate circuits of each of the SCR's. It has been found that with the instant motor inverter system the torque developed is proportional to the fundamental component of rotor current resulting in a system that has the characteristic of a separately excited direct current motor.

Applicant's invention involves the automatic controlling of the charging circuit for the storage battery portion 23 of the system which supplies direct current to the inverter circuit during acceleration. To provide means for controlling the storage battery circuit in accordance with the rise and fall of the voltage in the alternating current supply, the SCR control means 20 is used for applying bias voltage to the gate or control electrode of SCR 7 and SCR 8, so that the effective bias between the gate electrodes G7, G8 and the cathodes K7, K8 of the controlled rectifiers will vary with the condition of gate electrodes G1–G6 and cathodes K1–K6 of the inverter circuit. Thus as the voltage drops below the battery voltage, the SCR gate circuit 20 will be requiring increased rotor resistance for increased torque. At this point SCR 8, which has been non-conductive, will be triggered by the increase in gate current to cause SCR 8 to conduct and release battery voltage and thereby increase rotor resistance. At the same time, battery current will be released through the inverter and into the alternating current circuit supplying additional power to the drive motor. In this way the engine can ignore small changes in power requirements while under reduced power needs, the battery will recharge through SCR 7.

On the other hand, if the battery voltage should be very low, the resistance in the rotor circuit would be too low to provide adequate starting torque for the motor. In this case, SCR 7 would turn off, bypassing the battery until rotor resistance requirements dropped.

As an example of a possible arrangement for reducing fuel consumption and engine noise, the engine could be set up at three speeds. Thus for a vehicle speed range up to 30 miles per hour the engine 10 would be set to run at half speed. At this vehicle speed, frequent stops and starts would be expected and a high charging rate should be maintained.

From 30 to 55 miles per hour, power needs are moderate and frequent stops would not be required. For this vehicle speed range three quarters of the engine speed would be adequate. In this example a 75 horsepower engine is contemplated for use with a standard sized car with the result that the vehicle could cruise at speeds of 70 to 75 miles per hour. However, battery power supplied to the circuit would be capable of providing good acceleration to 80 or 85 miles per hour for brief periods of passing or hill climbing. In mountainous areas extra battery power could be added, if necessary, by installing larger batteries.

With the instant system employing oil cooled, high speed induction motors for the rear wheels of the vehicle together with the elimination of the automatic transmission and differential comparable performance for normal driving situations could be achieved.

I claim:
1. A hybrid prime mover electric motor system including a battery charging circuit, comprising:
   a prime mover,
   an alternator driven by said prime mover and connected to the electric motor for supplying alternating current to said electric motor,
   a rectifier circuit connected to the rotor of said electric motor for picking up the rotor current output,
   a storage battery means including a battery circuit connected to said rectifier circuit,
   an inverter circuit provided between said storage battery means and said rotor, and
   means for controlling said motor inverter circuit and said storage battery means for charging said battery means when in a low potential condition by said rotor current output during reduced power needs of said electric motor, said control means coupled with said battery circuit being operative to supply power from said storage battery means when in a high potential condition to increase the resistance of said rotor and simultaneously supply power from said battery means through said inverter circuit to said rotor during increased power needs of said electric motor.

2. The invention of claim 1, wherein said electric motor is a wound rotor induction motor.

3. The invention of claim 2, wherein said prime mover comprises an internal combustion engine.

4. The invention of claim 2, wherein said rectifier is a bridge connected diode rectifier.

5. The invention of claim 2, wherein said inverter circuit is a bridge connected static inverter having silicon controlled rectifiers.

6. The invention of claim 5, wherein said battery circuit comprises a pair of silicon-controlled rectifiers connected such that the anode of one and the cathode of the other are connected in common with the negative side of said battery.

7. The invention of claim 6, wherein said control means comprises a single direct current control circuit for the gate circuits of said inverter silicon-controlled rectifiers and said battery circuit silicon-controlled rectifiers.

References Cited

UNITED STATES PATENTS

| | | | |
|---|---|---|---|
| 2,835,859 | 5/1958 | Burns | 318—237 |
| 3,148,320 | 9/1964 | Davis | 318—197 |
| 3,227,937 | 1/1966 | Koppelman et al. | 318—237 |
| 3,242,408 | 3/1966 | Hetzel | 318—197 |
| 3,267,288 | 8/1966 | Maiden et al. | 307—46 |
| 3,329,877 | 7/1967 | Shibata | 318—197 |

ORIS L. RADER, Primary Examiner

K. L. CROSSON, Assistant Examiner

U.S. Cl. X.R.

318—212, 237, 441

UNITED STATES PATENT OFFICE
CERTIFICATE OF CORRECTION

Patent No. 3,521,137                     Dated July 21, 1970

Inventor(s) H. Van Sweden

It is certified that error appears in the above-identified patent and that said Letters Patent are hereby corrected as shown below:

Column 4, line 24, delete "rotor" and insert --motor--.

Signed and sealed this 8th day of October 1974.

(SEAL)
Attest:

McCOY M. GIBSON JR.          C. MARSHALL DANN
Attesting Officer            Commissioner of Patents